(12) United States Patent
Kouno et al.

(10) Patent No.: US 8,073,506 B2
(45) Date of Patent: Dec. 6, 2011

(54) MOBILE TERMINAL

(75) Inventors: Kazunori Kouno, Kanagawa (JP); Eiji Nishimura, Kanagawa (JP); Noriyoshi Sato, Kanagawa (JP)

(73) Assignee: Panasonic Corporation, Osaka (JP)

( * ) Notice: Subject to any disclaimer, the term of this patent is extended or adjusted under 35 U.S.C. 154(b) by 636 days.

(21) Appl. No.: 12/167,469

(22) Filed: Jul. 3, 2008

(65) Prior Publication Data

US 2009/0048005 A1 Feb. 19, 2009

(30) Foreign Application Priority Data

Jul. 6, 2007 (JP) .................................. 2007-178341
Oct. 31, 2007 (JP) .................................. 2007-284177

(51) Int. Cl.
*H04M 1/02* (2006.01)
(52) U.S. Cl. .................. 455/575.3; 455/575.1; 455/90.3
(58) Field of Classification Search .............. 455/575.1, 455/575.3, 575.4, 575.5, 575.8, 347–351, 455/90.3, 128; 361/679.01–679.03, 679.08–679.2, 361/679.26–679.3; 439/95, 100; 379/428.01, 379/433.13; D14/138 R–138 G
See application file for complete search history.

(56) References Cited

U.S. PATENT DOCUMENTS

| | | |
|---|---|---|
| 2004/0127266 A1 | 7/2004 | Aagaard |
| 2005/0125570 A1* | 6/2005 | Olodort et al. ................... 710/15 |
| 2005/0245296 A1* | 11/2005 | Hong et al. ................ 455/575.3 |
| 2006/0019728 A1 | 1/2006 | Sakamoto et al. |
| 2006/0022950 A1 | 2/2006 | Friedrichs, IV |
| 2006/0037175 A1 | 2/2006 | Hyun |
| 2006/0042044 A1* | 3/2006 | Hwang et al. ..................... 16/22 |
| 2006/0135225 A1* | 6/2006 | Lin et al. .................... 455/575.3 |
| 2006/0256960 A1* | 11/2006 | Bae et al. ................. 379/433.11 |
| 2007/0123319 A1* | 5/2007 | Hwang ....................... 455/575.1 |

FOREIGN PATENT DOCUMENTS

| | | |
|---|---|---|
| JP | 2004-185420 A | 7/2004 |
| JP | 2005-216158 | 8/2005 |
| JP | 2006-22899 | 1/2006 |
| JP | 2006-303723 A | 11/2006 |
| JP | 2007-122195 A | 5/2007 |

OTHER PUBLICATIONS

Explanation of Circumstances Concerning Accelerated Examination issued on Nov. 2, 2009, in corresponding Japanese Patent Application No. 2007-178341.
Extended European Search Report mailed on Apr. 6, 2010, in corresponding European Patent Application No. 08159730.4.
Office Action mailed Sep. 15, 2009, in corresponding Japanese Application No. 2007-284177.

* cited by examiner

*Primary Examiner* — Ajit Patel
*Assistant Examiner* — Erica Navar
(74) *Attorney, Agent, or Firm* — Seed IP Law Group PLLC (57) ABSTRACT

A mobile terminal includes: a first body including an operation part; a second body including a display; and a connector which rotatably connects the first body and the second body. The connector is connected to the first body, and rotates with respect to the first body about a first rotating shaft. The connector is connected to a lateral end of the second body, and rotates with respect to the second body about a second rotating shaft orthogonal to the first rotating shaft. A first fitting portion is formed on a connected surface of the connector to be connected with the second body. A second fitting portion which is fitted to the first fitting portion, is formed on the second body. When the second body relatively rotates about the second rotating shaft to overlap the connector on the connected surface, the first fitting portion fits to the second fitting portion.

9 Claims, 9 Drawing Sheets

MOBILE TERMINAL

BACKGROUND OF THE INVENTION

1. Technical Field

The present invention relates to a mobile terminal in which a first body and a second body are foldably connected together by a connector.

2. Background Art

In mobile terminals, such as a cellular phone, conventionally, foldable ones in which two bodies are rotatably connected together via a connector have come into wide use. For example, a mobile terminal in which a lower body (first body) is held by a user's hand when the mobile terminal is used, and is provided with an operation part which has a number of input keys and function keys on its surface, and an upper body (second body) is provided with a display (LCD) is known.

On the other hand, according to Patent Document 1, a mobile terminal which includes a first rotating shaft and a second rotating shaft which is connected on other places than a central portion of the first rotating shaft, and connected with an upper body in a direction intersecting the first rotating shaft is disclosed.

According to this mobile terminal, by rotating the upper body and a lower body about the first rotating shaft from the state where the upper body and the lower body are closed, it becomes possible to perform so-called longitudinal opening operation. Moreover, by rotating the upper body and the lower body about the second rotating shaft from the state where the upper body and the lower body are closed, it becomes possible to perform so-called lateral opening operation.

Here, the second rotating shaft supports only upper ends of the lower body and the upper body. That is, the lower body and the upper body are cantilever-supported by the second rotating shaft. For this reason, when the mobile terminal is laterally opened, it is considered that a relatively large load is applied to the second rotating shaft.

In the mobile terminal of Patent Document 1, a mobile terminal in which when being laterally opened, a convex portion provided in a longitudinal middle portion of the lower body engages with a cushioning member provided in a longitudinal middle portion of the upper body is suggested.

According to this configuration, when the mobile terminal is laterally opened, the laterally opened state will be stabilized by regulating the rotation of the second rotating shaft.

Further, according to Patent Document 2, a mobile terminal has a lower body (first body), a connector (second body), and an upper body (third body), and has a first hinge which openably connects the connector to the lower body, and a second hinge which openably connects the upper body to the connector in a direction orthogonal to the opening and closing direction of the connector by the first hinge. Also, the mobile terminal has an opening-and-closing regulating means which permits the operation of the first hinge and regulates the operation of the second hinge in a state where the connector and the upper body are closed.

According to this mobile terminal, by rotating the upper body and the lower body about the first hinge provided in the connector from the state where the upper body and the lower body are closed, it becomes possible to perform so-called longitudinal opening operation. Moreover, by rotating the upper body and the lower body about the second hinge provided in the connector from the state where the upper body and the lower body are closed, it becomes possible to perform so-called lateral opening operation.

[Patent Document 1] JP-A-2006-22899

[Patent Document 2] JP-A-2005-216158

In the mobile terminal described in Patent Document 1, the second rotating shaft is connected to one end of the upper body in its width direction. Therefore, if an external force is applied to the upper body in a longitudinally opened state, the upper body may be easily rotated about the second rotating shaft, which is unstable. Further, an external force may be concentrated on the second rotating shaft.

Further, when an external force is applied to the upper body even in a closed state, an external force may be concentrated on the second rotating shaft.

In the mobile terminal described in Patent Documents 2, when the upper body and the lower body are longitudinally opened, the upper body is once closed and integrated with the connector, and is opened about the first hinge. For this reason, the opening-and-closing regulating means prevents the upper body from being separated from the connector such that the upper body is opened about the second hinge.

However, the aforementioned opening-and-closing regulating means regulates opening and closing of the upper body only with a shaft body which reciprocates by a solenoid provided in the connector, and does not regulate even the position of the upper body. Therefore, if an external force acts on the upper body in a longitudinally opened state, there is a problem in that the second hinge may resist the external force, and consequently, instability and shaking may be caused. For example, in a body where a user talks over a telephone in a longitudinally opened state, a user's ear is pressed against a receiver, whereby an external force is often applied such that the opening angle in a longitudinal opening direction (direction in which the upper body rotates about the first hinge) becomes large. Moreover, since the second hinge is connected to one end of the upper body in its width direction, more instability is caused. Further, an external force may be concentrated on the second hinge.

SUMMARY OF THE INVENTION

The invention has been made in order to solve the above problems. The object of the invention is to provide a mobile terminal in which an upper body is stably maintained in a longitudinally opened state, and an external force is not concentrated on a rotating shaft which rotatably supports the upper body with respect to a connector.

A mobile terminal of the invention includes a first body including an operation part; a second body including a display; and a connector which rotatably connects the first body and the second body, wherein the connector is connected to the first body, and rotates with respect to the first body about a first rotating shaft; wherein the connector is connected to a lateral end of the second body, and rotates with respect to the second body about a second rotating shaft orthogonal to the first rotating shaft; wherein a first fitting portion is formed on a connected surface of the connector to be connected with the second body; wherein a second fitting portion is formed on the second body to fit to the first fitting portion; and wherein when the second body relatively rotates about the second rotating shaft to overlap the connector on the connected surface, the first fitting portion fits to the second fitting portion.

Further, in the invention, the first fitting portion is one of a convex portion and a concave portion, and the second fitting portion is the other of the convex portion and the concave portion.

According to these configurations, when the first body and the second body rotate about the second rotating shaft and are closed, the convex portion and the concave portion fit to each other.

Therefore, when the first body and the second body are closed with the second rotating shaft as an axis from a laterally opened state, the convex portion is made to fit to the concave portion, so that the second body can be guided to a specified position with respect to the connector.

Further, the relative position of the second body and the connector can be maintained in the state where the first body and the second body is opened and longitudinally opened.

Moreover, even if an external force is applied to the first body or the second body, a load can be prevented from being concentrated on the second rotating shaft whereby the second rotating shaft can be prevented from being damaged.

Further, in the invention, the convex portion is integrally formed by a guide portion and a guide claw portion, and the concave portion fits to the guide claw portion.

As the guide claw portion fits to the concave portion, in a state where the first body and the second body are longitudinally opened and closed, the position of the upper body can be more reliably stabilized, and any twist in a state where the first body and the second body are closed can be prevented.

Moreover, in the invention, the convex portion is formed integrally with the connector.

According to this configuration, since the convex portion is formed integrally with the connector, it is not necessary to separately and individually provide the convex portion. Moreover, by integrally forming the convex portion in the connector, the surface which faces the first body can be made flush with the connector.

Further, in the invention, the convex portion is continuously formed with a predetermined length across the longitudinal center of the second body, on the connected surface of the connector to be connected with the second body.

According to this configuration, the convex portion is arranged across the center with a predetermined length. Thereby, in a state where the first body and the second body are closed and opened, by the second rotating shaft and the fitting of the concave portion and convex portion, the position of the upper body can be more reliably stabilized, and any twist in a state where the first body and the second body are closed can be prevented.

Moreover, in the invention, a locking portion which locks the second body is formed at an end laterally opposite to a portion which is connected with the lateral end, on the connected surface of the connector to be connected with the second body; and the first fitting portion is formed between the portion which is connected with the lateral end, and the locking portion.

By this configuration, for example, even if the mobile terminal falls and an external force is applied to the first body or the second body in a state where the second body overlaps the connected surface of the connector, part of a load by the falling can be supported by the locking portion.

Accordingly, a load by falling can be prevented from being concentrated on the second rotating shaft, and thereby, breakage of the second rotating shaft can be prevented.

Further, in the invention, the first fitting portion or the second fitting portion is provided with a rib which intersects a longitudinal middle portion of the first fitting portion or the second fitting portion.

According to this configuration, since the first fitting portion or the second fitting portion has a rib in a direction which intersects the longitudinal middle portion, deformation of the first fitting portion or the second fitting portion is suppressed so that the first fitting portion or the second fitting portion can be made to firmly fit to each other, and when an external force acts on the upper body in a closed state, the force acting on the second rotating shaft can be reduced.

In addition, here, the first rotating shaft and the second rotating shaft indicate the direction of the rotational center lines of the first body and the second body when the first body and the second body shift from a closed state to a longitudinally opened state or a laterally opened state.

Further, in the invention, the first fitting portion includes a plurality of ones of the convex portions and the concave portions, and the second fitting portion includes a plurality of the others of the convex portions and the concave portions.

According to this configuration, when the first body and the second body rotate and are closed about the second rotating shaft, i.e., when they overlap the connector in the connected surface, the plurality of first fitting portions provided in the connector and the plurality of second fitting portions provided in the second body fit to each other. Thereby, when the first body and the second body are closed with the second rotating shaft as an axis from a laterally opened state, the first fitting portion fits to the second fitting portion. Thus, the second body can be reliably guided to a specified position with respect to the connector. In this case, a plurality of convex portions or concave portions are provided as the first fitting portion, and a plurality of concave portions or convex portions are provided as the second fitting portion. Thus, when an external force acts on the upper body in a closed state, the force is divided into several components, so that the force acting on the second rotating shaft can be reduced.

Further, in the invention, at least one of the first fitting portion and the second fitting portion includes an inclined surface at a corner closer to the second rotating shaft in the longitudinal direction.

According to this configuration, since an inclined surface is provided at a corner closer to the second rotating shaft in the longitudinal direction in at least one of the first fitting portion and the second fitting portion, when the first fitting portion fits to the second fitting portion, the fitting can be made smoothly.

Further, in the invention, the connector includes a guide surface on the connected surface to be connected with the second body.

According to this configuration, when the second body is closed from a laterally opened state, and the first fitting portion fit to the second fitting portion, the second body abuts on the guide surface of the connector. Thus, the impact to the second rotating shaft can be relieved.

Further, in the invention, in a state where the first fitting portion fits to the second fitting portion, a second gap between the second body and the connector in a surface opposite a surface with the display is made larger than a first gap between the second body and the connector in the surface with the display.

According to this configuration, the second gap between the second body and the connector opposite the display is made larger than the first gap between the second body and the connector on the side of the display. Thus, when an external force to open the first body and the second body excessively in the longitudinal opening direction, the second gap absorbs the deformation and alleviates deformation of the upper body. This can reduce the amount of deformation of the parts built in the upper body, thereby preventing breakage.

According to the mobile terminal of the invention, while the upper body is stably maintaining in a longitudinally opened state, an external force can be prevented from being concentrated on the second rotating shaft.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

First Embodiment

Hereinafter, a first embodiment of the invention will be described with reference to the drawings.

Figure 1A:
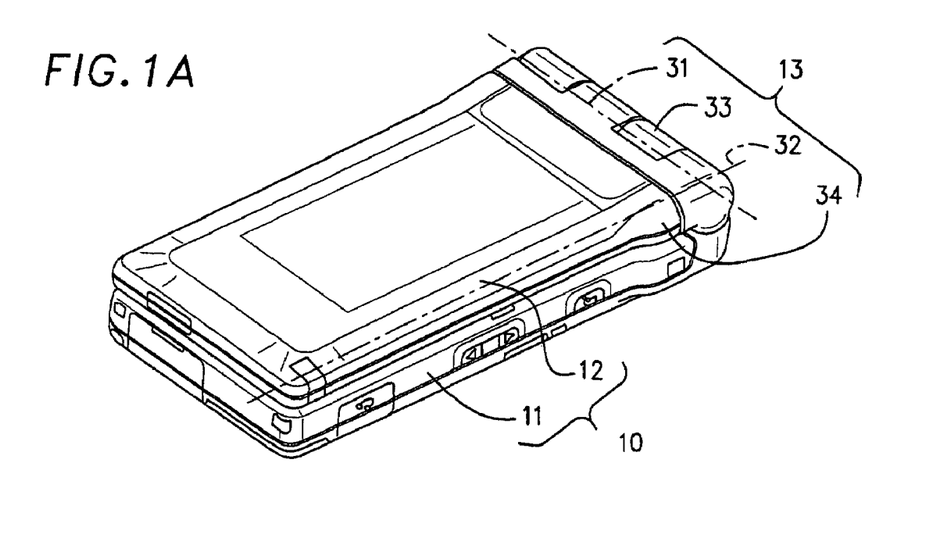
FIG. 1A is a perspective view showing that a mobile terminal according to the invention is closed.
Figure 1B:
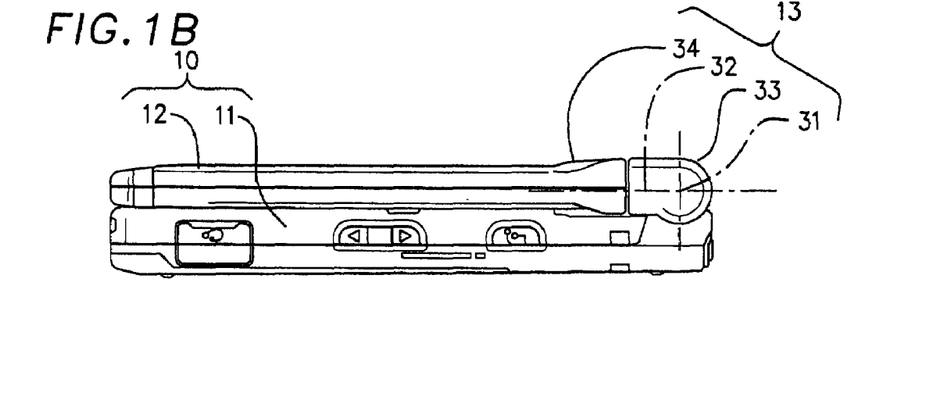
FIG. 1B is a side view showing that the mobile terminal according to the invention is closed.
Figure 2A:
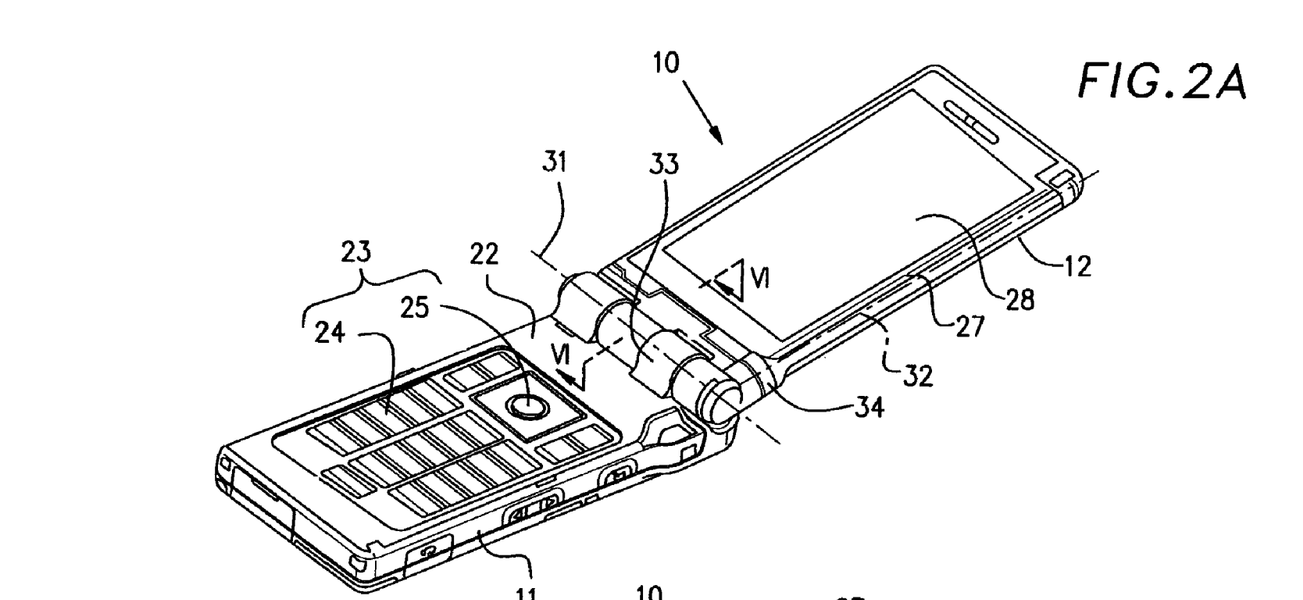
FIG. 2A is a perspective view showing a longitudinally opened state of the mobile terminal according to the invention.
Figure 2B:
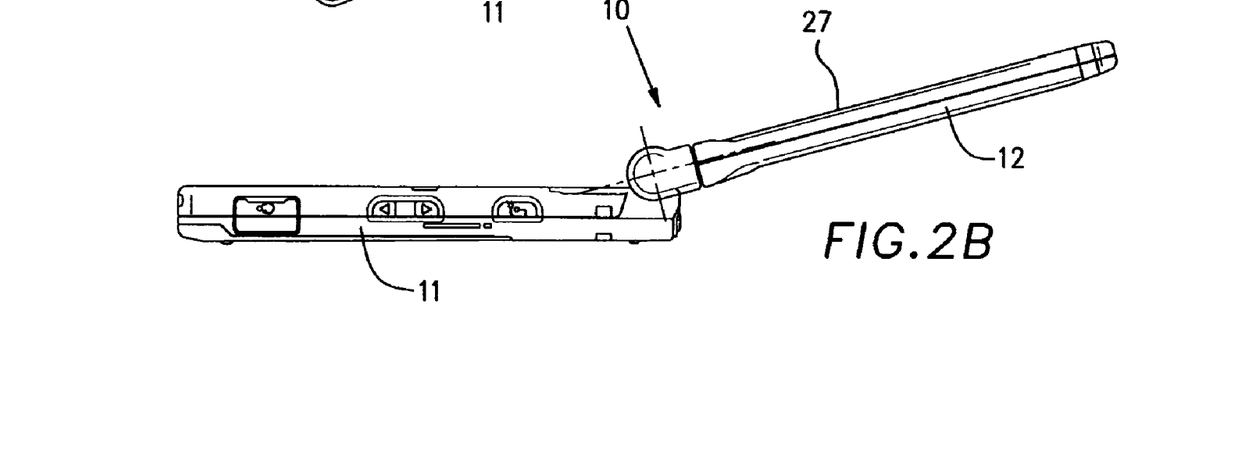
FIG. 2B is a side view showing the longitudinally opened state of the mobile terminal according to the invention.
Figure 3A:
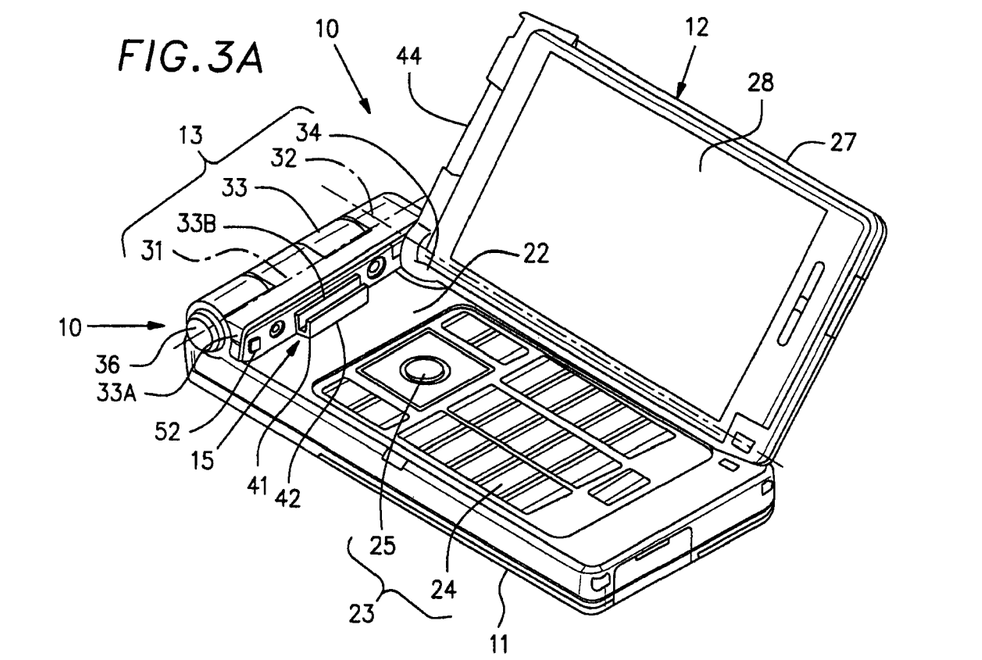
FIG. 3A is a perspective view showing that the mobile terminal according to the invention is laterally opened.

As shown in FIGS. 1 to 3B, the mobile terminal 10 according to the first embodiment includes a lower body (first body) 11, an upper body (second body) 12 provided above the lower body, a connector 13 which connects the lower body 11 and the upper body 12, a guiding and holding portion 15 (refer to FIG. 3A) which guides and holds the lower body 11 and the upper body 12, and a locking portion 16 (refer to FIG. 3B) which locks the upper body 12 in the state of being closed in a lateral opening direction (refer to FIG. 3A).

The lower body 11 is held by a user's hand when the mobile terminal 10 is used, and is provided with an operation part 23 which has a number of input keys 24 and function keys 25 on its surface 22.

The upper body 12 has a display (LCD) 28 on its surface 27.

The connector 13 is composed of a connector main body 13A, a first rotating member 33 (also refer to FIG. 6), and a second rotating member 34.

The first rotating member 33 is a pivot member which connects the lower body 11 and the connector main body 13A and which allows the connector main body 13A to rotate with respect to the lower body 11.

The axis of the first rotating member 33 is arranged along the first rotating shaft 31 mentioned above, is orthogonal to the thickness direction of the lower body 11, and is provided along the short-side direction (width direction) of the lower body 11.

The second rotating member 34 is a pivot member which connects the upper body 12 and the connector main body 13A and which allows the upper body 12 to rotate with respect to the lower body 11 and the connector main body 13A.

The axis of the second rotating member 34 is arranged along the second rotating shaft 32 mentioned above, is orthogonal to the thickness direction of the upper body 12, and is provided along the long-side direction (longitudinal direction) of the upper body 12.

One end of such a second rotating member 34 is connected to the connector main body 13A, and the other end thereof is connected to the upper body 12. Accordingly, the upper body 12 is cantilever-supported by the second rotating member 34.

Here, the first rotating shaft 31 and the second rotating shaft 32 indicate, respectively, the direction of the rotational center lines of the lower body 11 and the upper body 12 when the mobile terminal 10 shifts from a closed state to a laterally opened state or a longitudinally opened state.

Specifically, the first rotating shaft 31 is orthogonal to the thickness direction of the lower body 11, and is directed to the short-side direction (width direction) of the lower body 11. Further, the second rotating shaft 32 is orthogonal to the thickness direction of the lower body 12, and is directed to the long-side direction (longitudinal direction) of the upper body 12. The first rotating shaft 31 and the second rotating shaft 32 are orthogonal to each other.

In addition, in the invention, the first rotating member 33 or the second rotating member 34 rotates about their axes, with the rotation of the upper body 12 and the connector 13 with respect to the lower body 11 or the rotation of the upper body 12 with respect to the lower body 11 and the connector 13.

Further, the state where the upper body 12 rotates about the second rotating shaft 32 with respect to the lower body 11 refers to the state from a closed state to a completely laterally opened state, and the angle between the lower body 11 and the upper body 12 while the upper body 12 rotates with respect to the lower body 11 is no objection.

Moreover, strictly, it should be described in this embodiment that when the mobile terminal 10 becomes a longitudinally opened state from a closed state, the upper body 12 and the connector 13 rotate integrally with the lower body 11, and when the mobile terminal 10 becomes a laterally opened state from a closed state, the upper body 12 rotates with respect to the lower body 11 and the connector 13. In the following description, however, the longitudinally opened state or the laterally opened state will be described that the body 12 simply rotates with respect to the lower body 11, and the description about the connector 13 is often simplified.

Here, the first rotating shaft 31 and the second rotating shaft 32 indicate the direction of the rotational center lines of the lower body 11 and the upper body 12 when the lower body 11 which is a first body and the second body 12 which is a second body shifts from a closed state to a longitudinally opened state or a laterally opened state.

On the other hand, the first rotating member 33 and the second rotating member 34 are pivot members which allow the upper body 12 to rotate with respect to the lower body 11, and the first rotating member 33 or the second rotating member 34 rotates about its axis with the rotation of the upper body 12 with respect to the lower body 11.

By providing the mobile terminal 10 with the first rotating member 33 and the second rotating member 34, the lower body 11 and the upper body 12 can be opened longitudinally about the first rotating shaft 31, and the lower body 11 and the upper body 12 can be opened laterally about the second rotating shaft 32.

An opening operation portion 36 is provided at a left end 33A (refer to FIG. 3A) of the first rotating member 33. By pressing the opening operation portion 36 in the direction of an arrow shown in FIG. 3B, the lower body 11 and the upper body 12 can be opened from a closed state to a longitudinally opened state.

In the guiding and holding portion 15, as shown in FIG. 3A, a convex portion 41 is formed along a surface (hereinafter referred to as "upper body connected surface") 33B (refer to FIG. 5) which is to be connected with the upper body 12 in the connector 13, and a guide portion 42 of the convex portion 41 and a concave portion 44 provided on the upper body 12 are to be fitted to each other, in a closed state where the lower body 11 and the upper body 12 rotate about the second rotating shaft 32, and in a longitudinally opened state.

Figure 5:
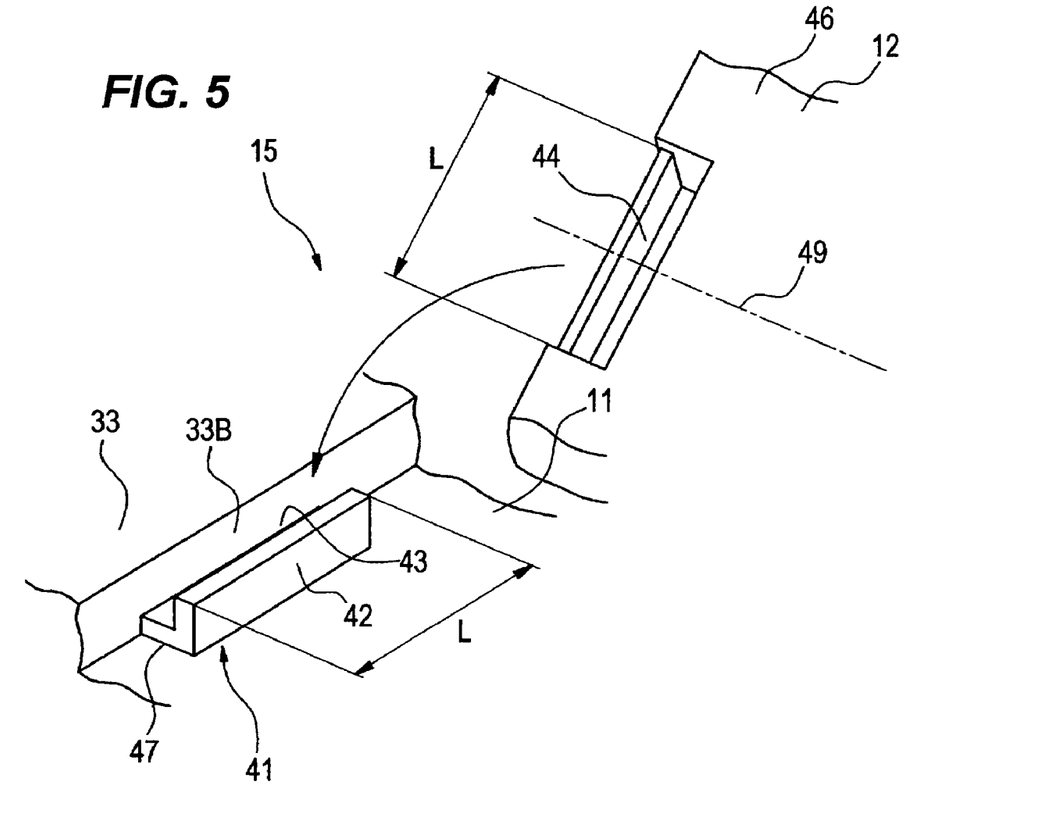
FIG. 5 is a perspective view showing that guiding and holding of the mobile terminal according to the invention are separated.
Figure 6:
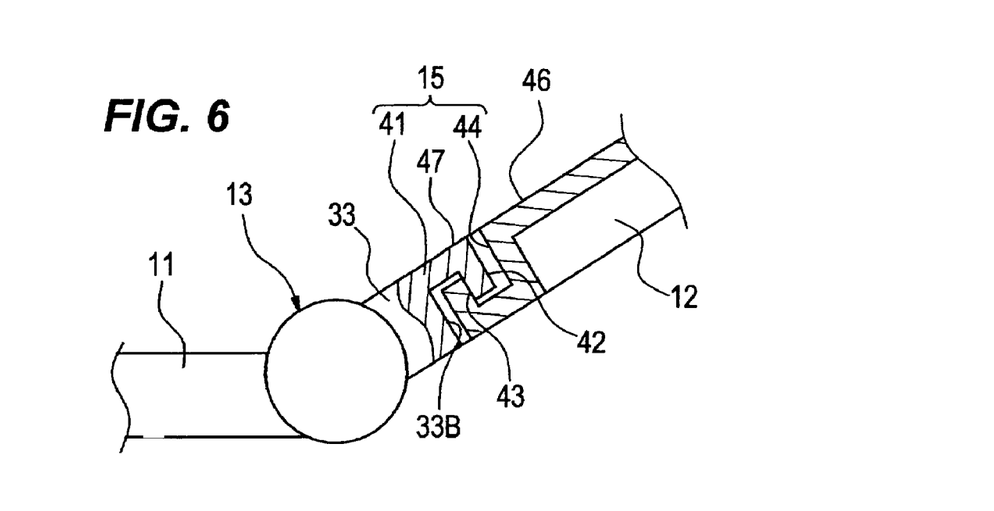
FIG. 6 is a sectional view taken along the line VI-VI of FIG. 2A.

Hereinafter, the guiding and holding portion 15 will be described in detail with reference to FIGS. 5 and 6.

The guiding and holding portion 15 is composed of a concave portion 44 provided at its end (hereinafter an "upper body base portion") on the side of the connector in the surface which becomes the inside when the upper body 12 is closed, and the convex portion 41 provided on the upper body connected surface 33B of the connector 13. The convex portion 41 is integrally formed in a substantially L shape by the guide portion 42 and the guide claw portion 43. As shown in FIG. 6, the guide claw portion 43 fits into the concave portion 44.

According to this configuration, when the lower body 11 and the upper body 12 are closed in the direction of the arrow with the second rotating shaft 32 shown in FIG. 3A as an axis from a laterally opened state, the guide claw portion 43 is made to engage the concave portion 44 so that the upper body base portion 46 can be guided to a specified position to the first rotating member 33.

Further, the relative positions of the upper body base portion 46 and the first rotating member 33 can be maintained in the state where the lower body 11 and the upper body 12 are closed and longitudinally opened.

Thereby, even if an external force is applied to the lower body 11 or the upper body 12, a load can be prevented from being concentrated on the second rotating member 34 (refer to FIG. 3A) whereby the second rotating member 34 can be prevented from being damaged.

In addition, by engaging the upper body base portion with the first rotating member 33 in the state where the lower body 11 and the upper body 12 are closed, any twist can be prevented from occurring about the second rotating shaft 32.

The convex portion 41 is formed integrally with the connection portion 13. By forming the convex portion 41 integrally with the connector 13, it is not necessary to separately and individually provide the convex portion 41.

The concave portion 44 is formed integrally with the upper body 12. Since the concave portion 44 is formed integrally with the upper body 12, it is not necessary to separately and individually provide the concave portion 44.

Moreover, the convex portion 41 is formed with a predetermined length L across a longitudinal center 49 at the end surface of the connector which faces the upper body 12.

In conformity with the length L of the convex portion 41, the concave portion 44 is also formed with a given length L.

Hereinafter, the locking portion 16 will be described in detail with reference to FIG. 3A to FIG. 4.

Figure 4:
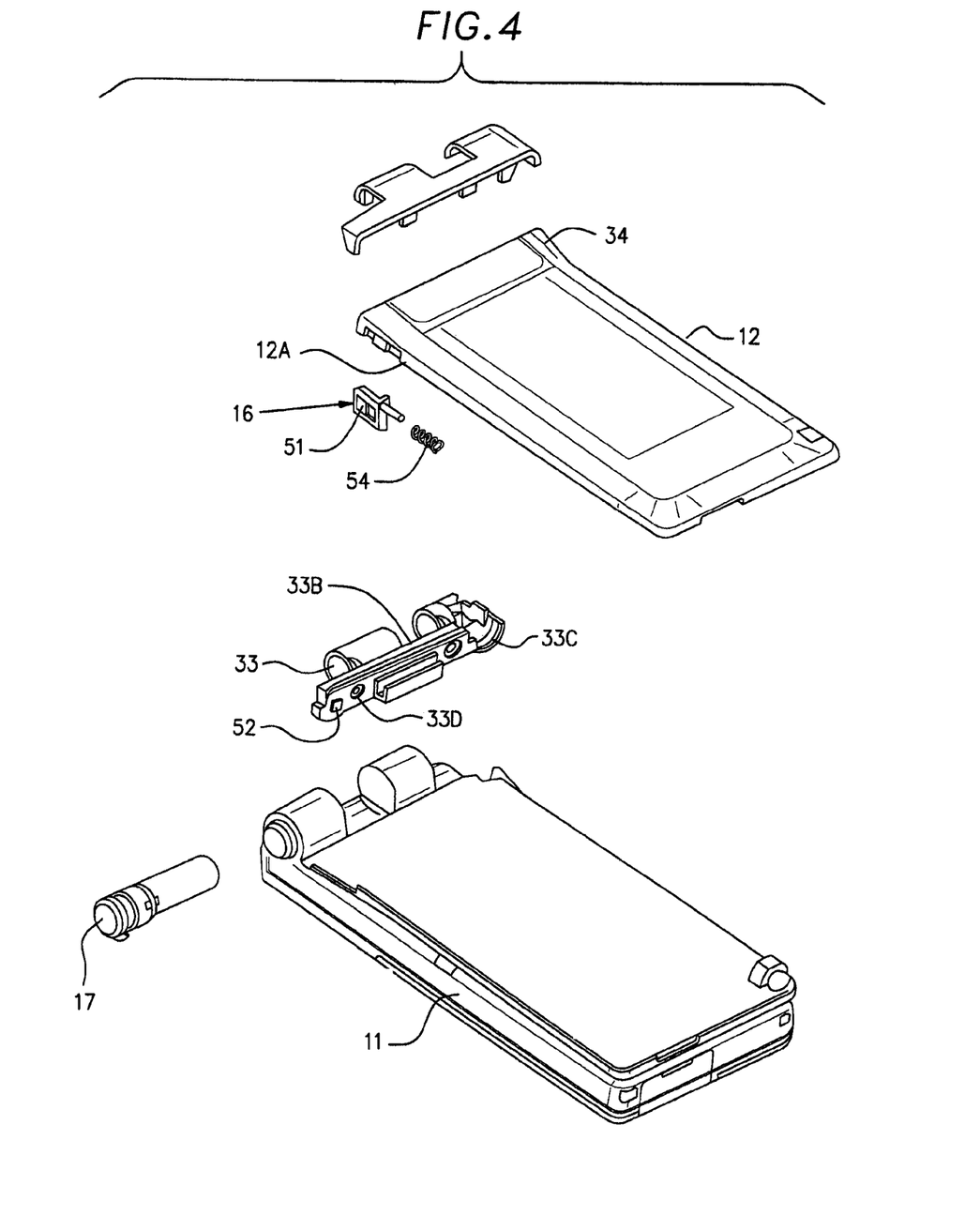
FIG. 4 is an exploded perspective view showing a locking portion of the mobile terminal according to the invention.

As for locking portion 16, as shown in FIG. 4, a pair of engaging portions are provided in the upper body connected surface 38B of the connector 13 to lock the upper body 12.

Figure 3B:
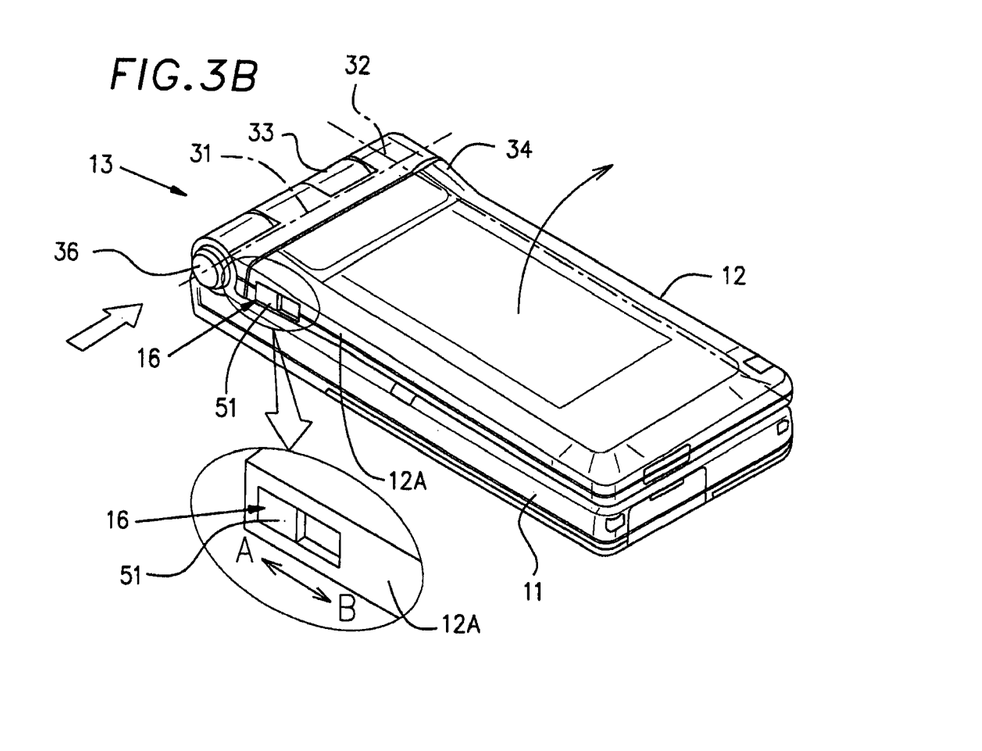
FIG. 3B is a perspective view when the state where the mobile terminal of the invention is closed is observed from the left side.

A lock button 51 as one engaging portion of the pair of engaging portions is provided on a side portion 12A of the upper body 12 so as to be slidable in the direction of an arrow A-B (longitudinal direction of the upper body 12) shown in FIG. 3B. The lock button 51 is held in its closed position by a return spring 54.

An engaging hole 52 as the other engaging portion of the pair of engaging portions is formed at the end of the upper body connected surface 33B of the connector 13 opposite the upper body connector in its longitudinal direction.

By slidingly moving the lock button 51 in the direction of an arrow B against the spring force of the return spring 54, the lock button 51 is removed from the engaging hole 52. Thereby, the upper body 12 can be manually opened about the second rotating shaft 32.

In a state where the upper body 12 and the lower body 11 overlap each other (a state where the upper body connected surface 33B in the connector 13 and the upper body 12) overlap each other, the lock button 51 slidingly move in the direction of an arrow A by the spring force of the return spring 54, and the lock button 51 is locked to the engaging hole 52.

Therefore, in a state where the upper body 12 overlaps the upper body connected surface 33B of the connector 13, the rotation of the second rotating shaft 34 is regulated by the pair of engaging portions.

By this configuration, the rotation about the second rotating shaft can be regulated and the second body can be prevented from rotating about the second rotating shaft unexpectedly, unless the engagement by the pair of engaging portions 51 and 52 is released in the closed state where the upper body 12 and the lower body 11 overlap each other.

Second Embodiment

Next, a mobile terminal according to a second embodiment of the invention will be described with reference to the drawings.

Figure 7A:
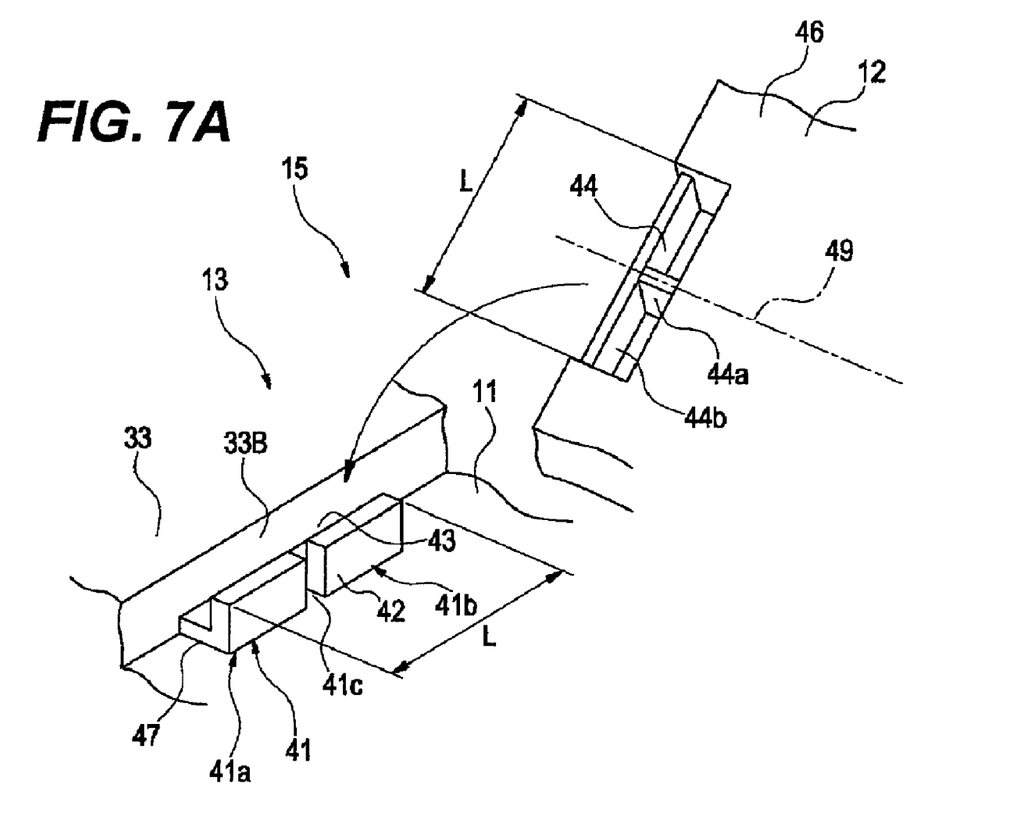
FIG. 7A is a perspective view showing that guiding and holding of the mobile terminal according to a second embodiment of the invention are separated.
Figure 7B:
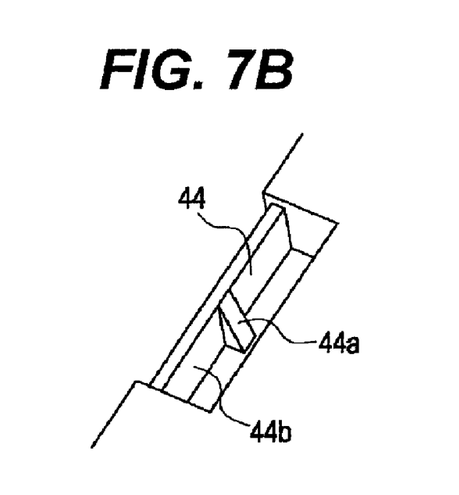
FIG. 7B shows a modification of a rib provided in a concave portion of the mobile terminal of FIG. 7A.
Figure 7C:
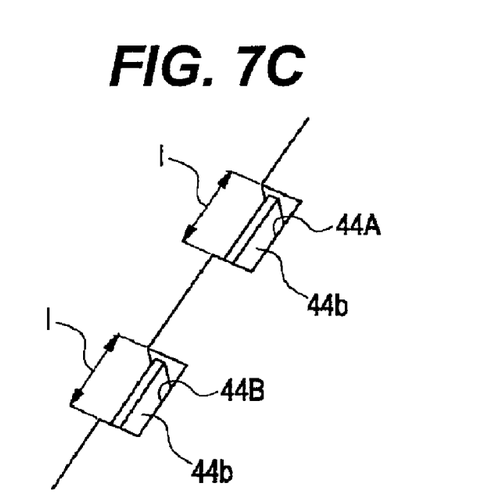
FIG. 7C shows a modification of the concave portion of the mobile terminal of FIG. 7A.

FIG. 7A is a perspective view showing that guiding and holding portion of the second embodiment of the invention are separated, FIG. 7B shows a modification of a rib provided in a concave portion of the mobile terminal shown in FIG. 7A, and FIG. 7C shows a modification of the concave portion of the mobile terminal shown in FIG. 7A. In addition, portions common to those of the aforementioned first embodiment are denoted by the same reference numerals, and the duplicate description thereof is omitted.

The guiding and holding portion 15 is composed of a concave portion 44 provided at its end (hereinafter an "upper body base portion") on the side of the connector in the surface which becomes the inside when the upper body 12 is closed, and the convex portion 41 provided in the upper body connected surface 33B of the connector 13. A longitudinal middle portion of the concave portion 44 is provided with a rib 44a which intersects the longitudinal direction of the concave portion 44. The convex portion 41 is integrally formed in a substantially L shape by the guide portion 42 and the guide claw portion 43, and is separated into two convex portions 41a and 41b so as not to collide with the rib 44a of the concave portion 44, and a gap 41c is formed between both the convex portions 41a and 41b. Accordingly, when the upper body 12 is closed in the laterally closed direction, as shown in FIG. 6, the guide claw portion 43 is configured so as to fit into the concave portion 44.

By this configuration, when the lower body 11 and the upper body 12 are closed in the direction of the arrow with the second rotating shaft 32 shown in FIG. 3A as an axis from a laterally opened state, the guide claw portion 43 is made to engage the concave portion 44 so that the upper body base portion 46 can be guided to a specified position to the first rotating member 33. In this case, since the longitudinal middle portion of the concave portion 44 is provided with the rib 44a which intersects a direction orthogonal to the longitudinal direction, deformation of the concave portion 44 is suppressed so that the convex portion 41 and the concave portion 44 can be made to firmly fit to each other, and when an external force acts on the upper body 12 in its closed state, the force acting on the second rotating shaft 32 can be reduced.

Although the body where the convex portion 41 is split into two pieces (41a, 41b) in correspondence with the rib 44a is shown in FIG. 7A, a cutout can be provided as one piece in the position corresponding to the rib 44a. Further, although the body where the rib 44a is received in a rectangular shape over the full short-side width of the concave portion 44 is shown, the rib can be provided in a triangular shape as shown in FIG. 7B.

Further, although the body where the concave portion 44 and the convex portion 41 are received in one place is shown in FIG. 7A, a plurality of (here, two) concave portions 44A and 44B and convex portions (now shown) can be provided as shown in FIG. 7C. In this case, since the width I of the concave portion 44 per one place can be made small, it is not necessary to provide the rib 44a.

Third Embodiment

Next, a mobile terminal according to a third embodiment of the invention will be described with reference to the drawings.

Figure 8A:
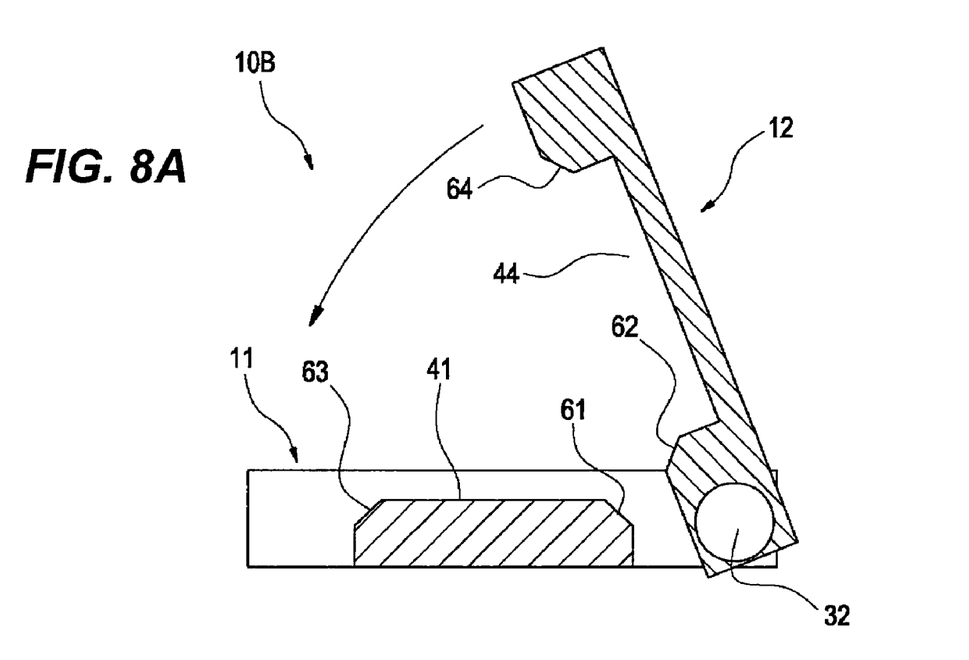
FIG. 8A is a sectional view when the upper body is laterally opened in a mobile terminal according to a third embodiment of the invention.
Figure 8B:
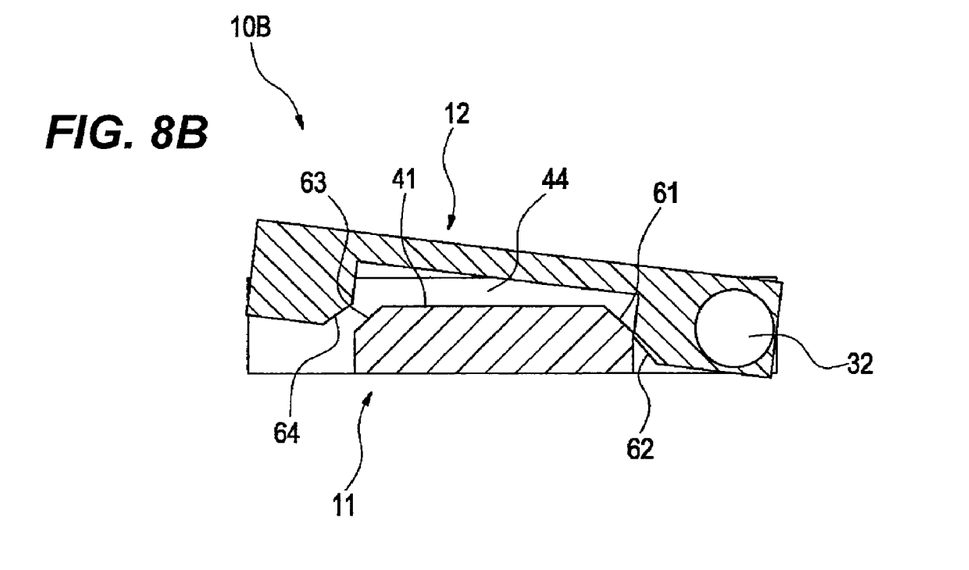
FIG. 8B is a sectional view when the upper body is closed from lateral opening.
Figure 9A:
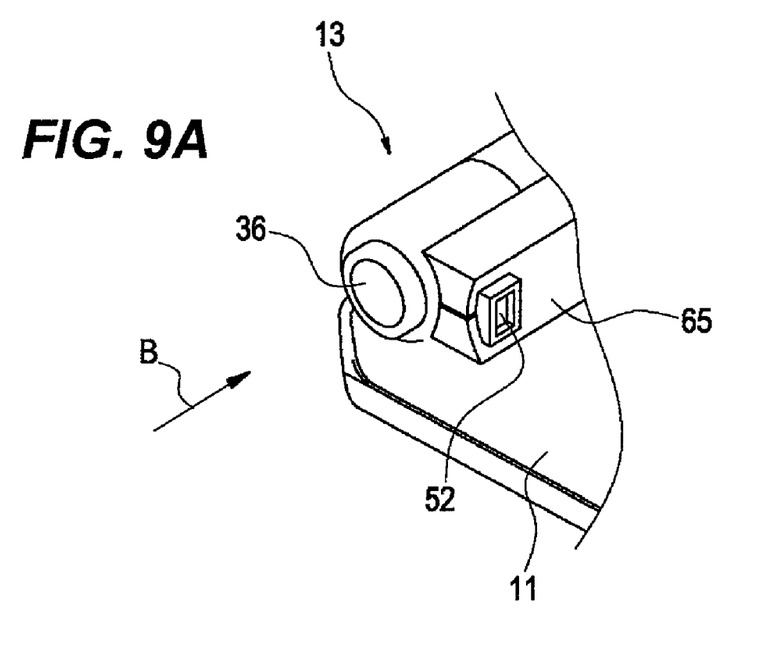
FIG. 9A is a perspective view showing an end of the connector.
Figure 9B:
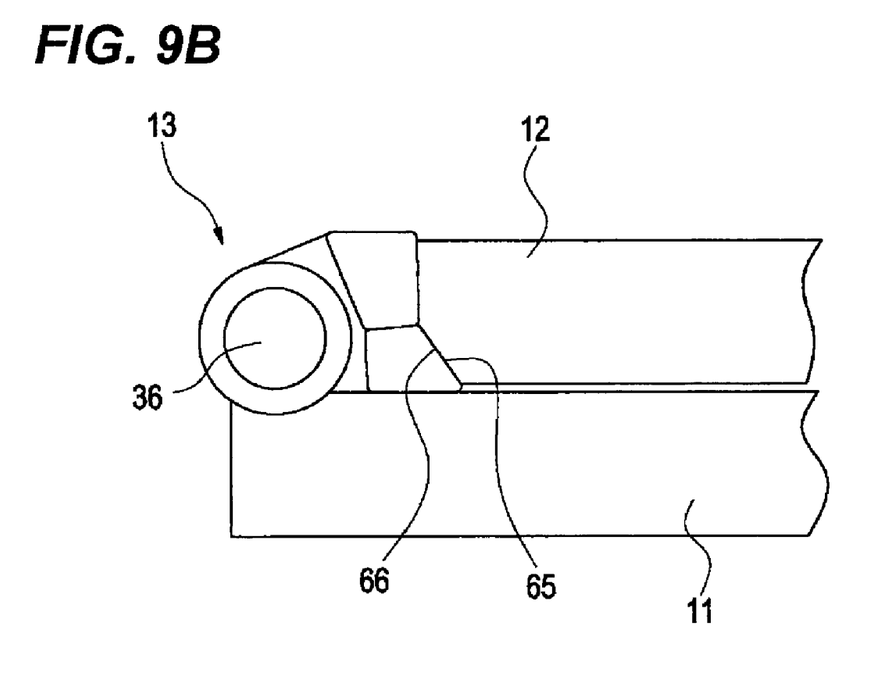
FIG. 9B is a side view of the connector when the upper body is closed from lateral opening.

FIG. 8A is a schematic sectional view showing a convex portion and a concave portion when an upper body is laterally opened in the mobile terminal according to the third embodiment of the invention, FIG. 8B is a schematic sectional view showing the convex portion and the concave portion when lateral opening of the upper body is closed, FIG. 9A is a perspective view of a connector, and FIG. 9B is a side view showing the connector when the upper body is closed. In addition, portions common to those of the aforementioned first embodiment are denoted by the same reference numerals, and the duplicate description thereof is omitted.

As shown in FIGS. 8A and 8B, in the mobile terminal 10B according to the third embodiment, inclined surfaces 61 and 62 are provided at corners closer to the second rotating shaft 32 in at least one (here, both) of the concave portion 44 which is a first fitting portion and the convex portion 41 which is a second fitting portion.

According to this configuration, when the lower body 11 and the upper body 12 are rotated and closed about the second rotating shaft 32, and when the convex portion 41 provided in the connector 13 and the concave portion 44 provided in the lower body 12 fit to each other, the inclined surfaces 61 and 62 are provided at the corners of at least one of the convex portions 41 and concave portion 44. Thus, when the convex portion 41 fits into the concave portion 44, the fitting can be made smoothly even in the body where chattering is caused in the second rotating shaft 32, and the convex portion 41 and the concave portion 44 slightly deviate from each other. Further, even if the fitting state between the convex portion 41 and the concave portion 44 is slightly tight without providing a gap, the convex portion and concave portion can fit to each other along the inclined surfaces 61 and 62, and the upper body 12 can be reliably received in a specified position of the lower body 11.

In addition, it is desirable to provide the inclined surface 61 on the side of the convex portion 41.

Further, as shown in FIGS. 8A and 8B, it is desirable to provide the inclined surfaces 63 and 64 not only at the corners of the convex portion 41 and the concave portion 44 on the side of the second rotating shaft 32 and at the corners thereof opposite the second rotating shaft. This can make the fitting more smooth.

Further, the inclined surfaces 61 and 62 can be formed as flat surfaces (C surfaces) or in an R-shape.

Further, as shown in FIGS. 9A and 9B, a guide surface 65 is provided on the surface of the connector 13 which is connected with the upper body 12. As shown in FIGS. 9A and 9B, the guide surface 65 can be formed as an inclined surface which is inclined upward, and in correspondence with this, an inclined surface 66 is also provided at the end farther from the second rotating shaft 32 in the end surface of the upper body 12 on the side of the connector 13.

According to this configuration, when the upper body 12 is closed from a laterally opened state, and the convex portion 41 fits into the concave portion 44, the inclined surface 66 of the upper body 12 abuts on the guide surface 65 of the connector 13. Thus, the impact to the second rotating shaft 32 can be relieved. In addition, it is effective that the guide surface 65 is provided on the side of the connector 13 farther from the second rotating shaft 32.

Fourth Embodiment

Next, a mobile terminal according to a fourth embodiment of the invention will be described with reference to the drawings.

Figure 10A:
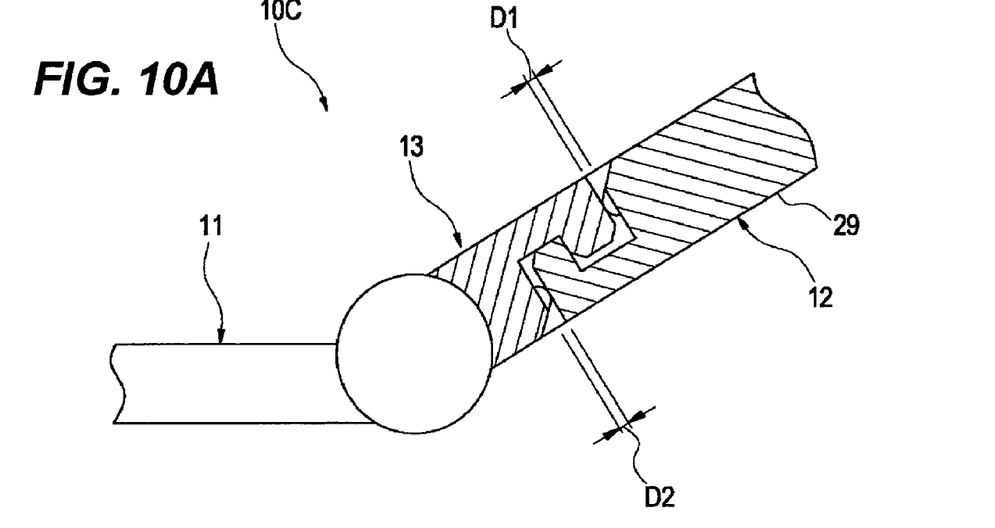
FIG. 10A is an enlarged sectional view of the connector according to a fourth embodiment of the invention.
Figure 10B:
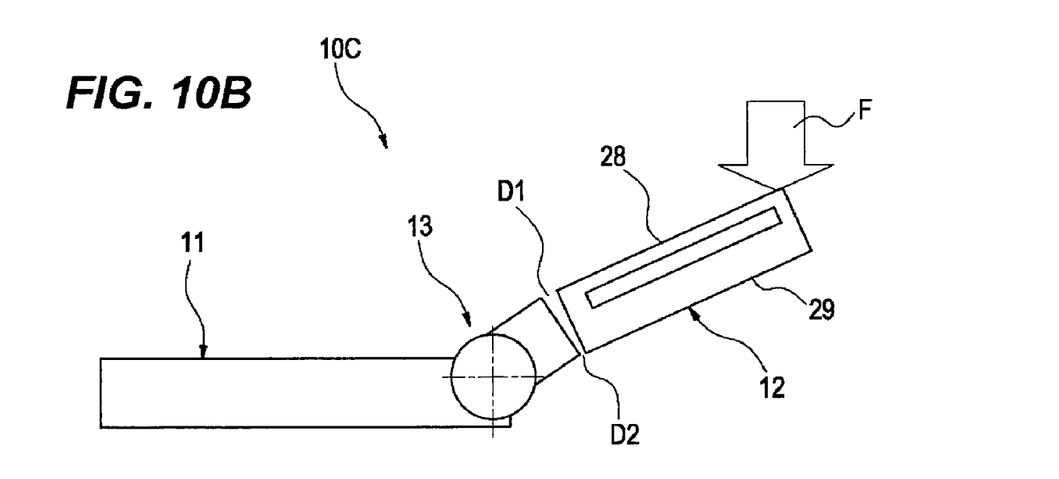
FIG. 10B is a schematic sectional view showing that an external force has acted on the longitudinally opened upper body.

FIG. 10A is a sectional view showing the fitting state between the first fitting portion and the second fitting portion, and FIG. 10B is a schematic side view showing that an external force has acted on the tip of the upper body. In addition, portions common to those of the aforementioned first embodiment are denoted by the same reference numerals, and the duplicate description thereof is omitted.

As shown in FIGS. 10A and 10B, in a mobile terminal 10C according to the fourth embodiment, when the lower body 11 and the upper body 12 are rotated and closed about the second rotating shaft 32, i.e., when they overlap the connector 13 in the upper body connected surface 33B, the convex portion 41 and the concave portion 44 provided in the upper body 12 are configured so as to fit to each other, and a second gap D2 between the upper body 12 and the connector 13 in a surface 29 opposite a surface with the display 28 is made larger than a first gap D1 between the upper body 12 and the connector 13 in the surface with the display 28.

According to this configuration, the second gap D2 is made larger than the first gap D1. Thus, when the upper body 12 and the lower body 11 is closed with the second rotating shaft 32 as an axis from a laterally opened state, and when the convex portion 41 fits into the concave portion 44, an external force F to excessively open the upper body 12 and the lower body 11 in the longitudinally opened direction acts, (refer to FIG.

10B). At this time, the second gap D2 absorbs deformation, and the deformation of the upper body 12 is relieved. This can reduce the amount of deformation of the parts built in the upper body 12, thereby preventing breakage.

In addition, the mobile terminal of the invention is not limited to the aforementioned embodiments, and suitable modifications, improvements, etc. thereof can be made.

For example, in each of the aforementioned embodiments, an example in which the convex portion 41 is provided on the connector 13 and the concave portion 44 is provided on the upper body 12. However, the invention is not limited thereto. For example, the concave portion 44 may be provided on the connector 13, and the convex portion 41 may be provided on the upper body 12.

Further, the shapes of the convex portion 41, the guide portion 42, the guide claw portion 43, the concave portion 44, etc. which are illustrated in this embodiment can be changed suitably.

The invention is suitable for the application of a mobile terminal in which the first body and the second body are rotatably connected together by the connector.

What is claimed is:

1. A mobile terminal comprising:
   a first body including an operation part;
   a second body including a display;
   a connector (i) connected to the first body, and rotatable with respect to the first body about a first rotating shaft, and
   (ii) connected to a lateral end of the second body, and rotatable with respect to the second body about a second rotating shaft orthogonal to the first rotating shaft;
   a first fitting portion formed on a connected surface of the connector to be connected with the second body, the first fitting portion including a plurality of convex portions arranged in parallel to the first rotating shaft; and
   a second fitting portion formed on the second body, the second fitting portion including a concave portion provided with a rib,
   wherein, when the second body relatively rotates about the second rotating shaft to overlap the connector on the connected surface, the first fitting portion fits into the second fitting portion.

2. The mobile terminal according to claim 1, wherein the convex portion is integrally formed by a guide portion and a guide claw portion, and the concave portion fits into the guide claw portion.

3. The mobile terminal according to claim 1, wherein the convex portion is integrally formed on the connector.

4. The mobile terminal according to claim 1, wherein the convex portions are continuously formed with a predetermined length across a longitudinal center of the second body, on the connected surface of the connector to be connected with the second body.

5. The mobile terminal according to claim 1, wherein a locking portion which locks the second body is formed at an end laterally opposite to a portion which is connected with the lateral end, on the connected surface of the connector to be connected with the second body,
   wherein the first fitting portion is formed between the portion which is connected with the lateral end, and the locking portion.

6. The mobile terminal according to claim 1, wherein the rib of the second fitting portion intersects a longitudinal middle portion of the second fitting portion.

7. The mobile terminal according to claim 1, wherein at least one of the first fitting portion or the second fitting portion includes an inclined surface at a corner closer to the second rotating shaft in the longitudinal direction.

8. The mobile terminal according to claim 7, wherein the connector includes a guide surface on the connected surface to be connected with the second body.

9. The mobile terminal according to claim 1, further comprising, a first gap and a second gap formed between the second body and the connector when the first fitting portion fits to the second fitting portion, wherein
   the second body includes a front surface that includes the display and a back surface opposite the front surface, the first gap is formed in a plane of the front surface,
   the second gap is formed in a plane of the back surface, and the second gap is wider than the first gap.

* * * * *